United States Patent
Onishi et al.

(10) Patent No.: US 12,083,485 B2
(45) Date of Patent: Sep. 10, 2024

(54) SLURRY MANUFACTURING APPARATUS AND SLURRY MANUFACTURING METHOD

(71) Applicant: NIHON SPINDLE MANUFACTURING CO., LTD., Hyogo (JP)

(72) Inventors: Keiichiro Onishi, Hyogo (JP); Keiichi Asami, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 1300 days.

(21) Appl. No.: 15/889,880

(22) Filed: Feb. 6, 2018

(65) Prior Publication Data

US 2018/0221832 A1   Aug. 9, 2018

(30) Foreign Application Priority Data

Feb. 9, 2017   (JP) .................... 2017-022344

(51) Int. Cl.
*B01F 3/04*   (2006.01)
*B01F 3/22*   (2006.01)
(Continued)

(52) U.S. Cl.
CPC ........ *B01F 23/233* (2022.01); *B01F 23/2319* (2022.01); *B01F 23/803* (2022.01);
(Continued)

(58) Field of Classification Search
CPC . H01M 4/04; H01M 4/139; B01F 7/30; B01F 9/0001; B01F 3/04099;
(Continued)

(56) References Cited

U.S. PATENT DOCUMENTS 6,200,703 B1   3/2001   Kashio et al.
7,316,865 B2 *  1/2008   Kweon ................ H01M 4/505
                                                                429/218.1
(Continued)

FOREIGN PATENT DOCUMENTS

JP   H09-180725 A   7/1997
JP      3232910 B2   11/2001
(Continued)

OTHER PUBLICATIONS

Rajasingam et al., "Solubility of carbon dioxide in dimethylsulfoxide and N-methyl-2-pyrrolidone at elevated pressure", Website https://www.sciencedirect.com/science/article/pii/S0896844603002948, The Journal of Supercritical Fluids, vol. 31, Issue 3, Nov. 2004, Accepted Dec. 12, 2003, pp. 227-234 (8 pages), Elsevier B. V., Netherlands.
(Continued)

*Primary Examiner* — Elizabeth Insler
(74) *Attorney, Agent, or Firm* — Michael Best & Friedrich LLP

(57) ABSTRACT

A slurry manufacturing apparatus includes a rotation-revolution mixing device which mixes and prepares a slurry by rotational movement and revolving movement and a gas injection mechanism which dissolves carbonic acid gas in the slurry prepared by the rotation-revolution mixing device, in which the gas injection mechanism dissolves the carbonic acid gas in the slurry by injecting the carbonic acid gas under pressure in a sealed state.

16 Claims, 6 Drawing Sheets

(51) Int. Cl.

| | |
|---|---|
| *B01F 7/16* | (2006.01) |
| *B01F 7/30* | (2006.01) |
| *B01F 9/22* | (2006.01) |
| *B01F 23/23* | (2022.01) |
| *B01F 23/233* | (2022.01) |
| *B01F 23/80* | (2022.01) |
| *B01F 27/1125* | (2022.01) |
| *B01F 27/806* | (2022.01) |
| *B01F 27/95* | (2022.01) |
| *B01F 29/60* | (2022.01) |
| *B01F 29/90* | (2022.01) |
| *H01M 4/04* | (2006.01) |
| *H01M 4/131* | (2010.01) |
| *H01M 4/1391* | (2010.01) |
| *H01M 4/485* | (2010.01) |
| *H01M 4/62* | (2006.01) |
| *H01M 10/052* | (2010.01) |
| *B01F 23/237* | (2022.01) |
| *B01F 29/00* | (2022.01) |
| *H01M 4/02* | (2006.01) |

(52) U.S. Cl.
CPC ...... *B01F 27/11251* (2022.01); *B01F 27/806* (2022.01); *B01F 27/95* (2022.01); *B01F 29/60* (2022.01); *B01F 29/90* (2022.01); *H01M 4/04* (2013.01); *H01M 4/131* (2013.01); *H01M 4/1391* (2013.01); *H01M 4/485* (2013.01); *H01M 4/628* (2013.01); *H01M 10/052* (2013.01); *B01F 23/23363* (2022.01); *B01F 23/23762* (2022.01); *B01F 29/40351* (2022.01); *B01F 29/40354* (2022.01); *H01M 2004/028* (2013.01)

(58) Field of Classification Search
CPC .......... B01F 3/04439; B01F 2009/0069; B01F 3/04248; B01F 2003/04248; B01F 23/233

USPC ....................................................... 366/101
See application file for complete search history.

(56) References Cited

U.S. PATENT DOCUMENTS

| | | | |
|---|---|---|---|
| 8,092,075 B2 * | 1/2012 | Ishii ...................... B29B 7/106 | |
| | | | 366/139 |
| 8,530,082 B2 | 9/2013 | Uchida et al. | |
| 2014/0271413 A1 * | 9/2014 | Frianeza-Kullberg ..................... | |
| | | | B01F 7/00558 |
| | | | 422/606 |
| 2015/0034862 A1 | 2/2015 | Kifune | |
| 2015/0340681 A1 * | 11/2015 | Iwasaki .................. H01M 4/04 | |
| | | | 427/58 |

FOREIGN PATENT DOCUMENTS

| | | |
|---|---|---|
| JP | 2011-146152 A | 7/2011 |
| JP | 2011-183270 A | 9/2011 |
| JP | 2012-003891 A | 1/2012 |
| JP | 5158453 B2 | 3/2013 |
| JP | 2015-035344 A | 2/2015 |
| JP | 2015-037009 A | 2/2015 |
| WO | WO-2013/136828 A1 | 9/2013 |
| WO | WO-2017/138193 A1 | 8/2017 |

OTHER PUBLICATIONS

Bohloul et al., Experimental and theoretical study of $CO_2$ solubility in N-methyl-2-pyrrolidone (NMP), Website https://www.sciencedirect.com/science/article/pii/S0378381213007486, Fluid Phase Equilibria, vol. 365, Mar. 15, 2014, pp. 106-111 (6 pages), Elsevier B. V., Netherlands.
Extended Search Report issued in European Patent Application No. 18155110.2, mailed Jun. 7, 2018.

* cited by examiner

SLURRY MANUFACTURING APPARATUS AND SLURRY MANUFACTURING METHOD

RELATED APPLICATIONS

Priority is claimed to Japanese Patent Application No. 2017-22344, filed Feb. 9, 2017, the entire content of which is incorporated herein by reference.

BACKGROUND

Technical Field

Certain embodiments of the present invention relate to a slurry manufacturing apparatus, which is for manufacturing a slurry for a positive electrode of a nonaqueous electrolyte secondary battery containing an alkali metal complex oxide, and a slurry manufacturing method.

Description of Related Art

A positive electrode and a negative electrode of a battery are manufactured by coating a current collector with a slurry containing an active material, a binder, and carbon black which is added if necessary.

As a binder used for manufacturing a negative electrode, an aqueous binder represented by styrene-butadiene rubber (SBR) is mainly used. In contrast, as a binder for a positive electrode, because a butadiene component is vulnerable to oxidation degradation, a solvent-based binder based on polyvinylidene fluoride (PVDF) is mainly used.

In the PVDF-based binder used as the aforementioned binder for a positive electrode, as a solvent, an organic solvent N-methylpyrrolidone (NMP) is used, and hence the binder causes a big environmental load. Therefore, aqueous binders that cause a light environmental load are drawing attention.

Lithium complex oxides used for a positive electrode, such as lithium cobaltate ($LiCoO_2$) or a ternary material ($LiNi_{0.33}CO_{0.33}Mn_{0.33}O_2$), contain lithium hydroxide as an unreacted synthetic substance. Therefore, in a case where an aqueous binder is used in these active materials, a pH level increases. A strong alkaline slurry with a pH level of higher than 11 corrodes an aluminum current collector at the time of coating and generates hydrogen gas in the interface between the active material layer and the aluminum current collector. Due to the hydrogen gas, the active material layer foams, and this leads to a decrease in electrode strength or the exfoliation or detachment of the active material layer. Furthermore, unfortunately, it is difficult to obtain a uniform electrode.

As a measure for the above problems, a surface coating method for preventing the active material from coming into contact with water or a method of using a stainless steel current collector having excellent alkali resistance has been developed.

In addition, as a method for preventing the corrosion of the aluminum current collector, there is a method of controlling the pH level of a slurry by neutralizing the slurry by the addition of an acid. In this case, the pH level needs to be within a range of 3 to 11 in which aluminum does not easily dissolve. However, in a case where an inorganic acid such as hydrochloric acid, nitric acid, sulfuric acid, or hydrofluoric acid is used as a neutralizer, sometimes the active material is dissolved at the time of adding the neutralizer. Furthermore, in a case where an excess of acid is injected, the pH level rapidly decreases. Therefore, unfortunately, it is difficult to control the pH level.

The relates art describes that for solving the above problem, in addition to the aforementioned neutralizer, an organic acid is preferable. In a case where an organic acid such as formic acid, acetic acid, oxalic acid, or butyric acid is used as a neutralizer, the rapid decrease in the pH level resulting from the injection of an excess of an acid can be mitigated. Furthermore, in a step of drying the electrode, the organic acid is scattered by decomposition or evaporation, and consequently, it is possible to prevent the acid from remaining in the molded electrode.

The related art describes that in a case where the surfaces of positive electrode active material particles are coated with lithium carbonate, it is possible to inhibit an OH unit from being generated in the positive electrode active material particles, and the positive electrode active material particles coated with the lithium carbonate do not easily react with moisture.

The related art suggests a method for performing a neutralization treatment on a positive electrode active material by bringing a lithium-nickel complex oxide or a lithium-cobalt complex oxide into contact with an acidic gas-containing gas under dry conditions.

The related art suggests a method for manufacturing a positive electrode mixture, in which in a kneading step of kneading a lithium complex oxide with at least either a conductive auxiliary agent or a binder resin, kneading is performed in a carbonic acid gas atmosphere.

The related art suggests a method for preparing a positive electrode plate by causing carbonic acid gas to flow in a paste obtained by kneading a positive electrode active material with a thickener such that the pH level of the paste becomes 7 to 11, then applying the paste to the surface of a current collector, and drying the paste.

The related art suggests a method for forming an intervening layer of an electrode by mixing microbubbles having a bubble diameter of equal to or smaller than 500 □m with an electrode mixture paste and coating a current collector of an electrode with the paste having reduced density.

Among these, particularly according to the methods described in the related art, because carbonic acid gas is used as a neutralizer, an acid does not remain as an impurity in the interior of a battery, and a nonconductive layer is not formed in the interface between the current collector and the active material layer. Therefore, the methods have an advantage in that the conductivity or the battery characteristics can be improved.

SUMMARY

A characteristic constitution of the desirable slurry manufacturing apparatus is a slurry manufacturing apparatus for manufacturing a slurry for a positive electrode of a non-aqueous electrolyte secondary battery containing an alkali metal complex oxide, the apparatus including a rotation-revolution mixing device which mixes and prepares a slurry by rotational movement and revolving movement and a gas injection mechanism which dissolves carbonic acid gas in the slurry prepared by the rotation-revolution mixing device, in which the gas injection mechanism dissolves the carbonic acid gas in the slurry by injecting the carbonic acid gas under pressure in a sealed state.

A characteristic constitution of the desirable slurry manufacturing method is a slurry manufacturing method for manufacturing a slurry for a positive electrode of a nonaqueous electrolyte secondary battery containing an alkali metal complex oxide, the method including a rotation-revolution mixing step of mixing and preparing a slurry by rotational movement and revolving movement, a gas injection step of dissolving carbonic acid gas in the slurry prepared by the rotation-revolution mixing step, and a deaerating step of deaerating the carbonic acid gas from the slurry having undergone the gas injection step, in which in the gas injection step, the carbonic acid gas is dissolved in the slurry by injecting the carbonic acid gas under pressure in a sealed state.

A characteristic constitution of the desirable slurry manufacturing apparatus is a slurry manufacturing apparatus for manufacturing a slurry for a positive electrode of a non-aqueous electrolyte secondary battery containing an alkali metal complex oxide, the apparatus including a rotation-revolution mixing device which mixes and prepares a slurry by rotational movement and revolving movement and a gas injection mechanism that dissolves carbonic acid gas in a slurry material which is a materials of the slurry, in which the gas injection mechanism dissolves the carbonic acid gas in the slurrymaterial by injecting the carbonic acid gas under pressure in a sealed state.

A characteristic constitution of the desirable slurry manufacturing method is a slurry manufacturing method for manufacturing a slurry for a positive electrode of a non-aqueous electrolyte secondary battery containing an alkali metal complex oxide, the method including a rotation-revolution mixing step of mixing and preparing a slurry by rotational movement and revolving movement, a gas injection step of dissolving carbonic acid gas in a slurry material which is a material of the slurry, and a deaerating step of deaerating the carbonic acid gas from the slurry having undergone the gas injection step, in which in the gas injection step, the carbonic acid gas is dissolved in the slurry material by injecting the carbonic acid gas under pressure in a sealed state.

DETAILED DESCRIPTION

Figure 1:
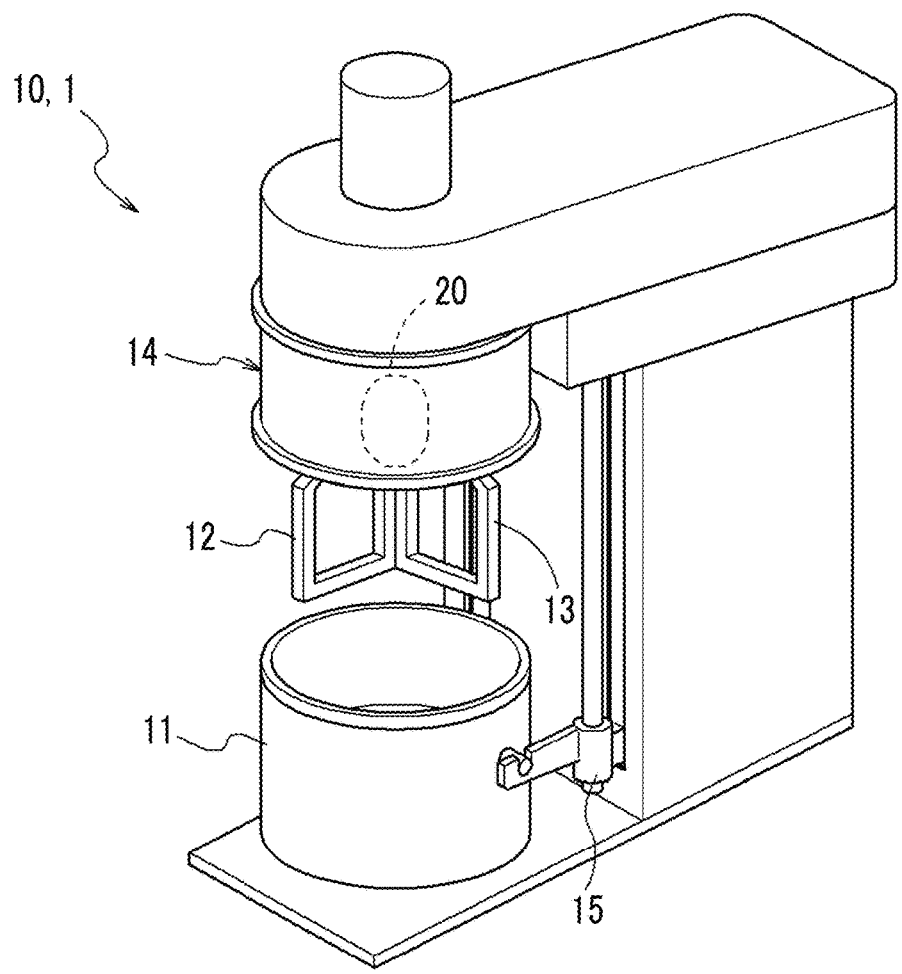
FIG. 1 is a perspective view schematically showing a slurry manufacturing apparatus.

However, the methods for preventing the corrosion of an aluminum current collector described in the aforementioned related art have the following problems.

The method described in the related art has a problem in that a salt generated by neutralization has a large molecular weight, and hence the energy density of the electrode decreases.

The related art describes that in the method disclosed in the related art, in a case where the slurry neutralized using the aforementioned organic acid is used for coating, then dried, and used as a positive electrode active material layer in a battery, anions derived from the added acid may be eluted into the electrolytic solution of the battery, and hence the battery characteristics may deteriorate.

In the method described in the related art, the active material needs to be left to stand in the carbonic acid gas atmosphere for a long period of time, and the number of steps increases. Therefore, this method has a problem in that the manufacturing lead time increases.

In the methods described in the related art, the slurry is kneaded in the carbonic acid gas atmosphere, or carbonic acid gas is caused to flow in the slurry. Accordingly, in these methods, the manufacturing lead time is shorter than that in the related art. However, even though 100% carbonic acid gas is used, in a carbonic acid gas atmosphere under normal pressure, only a small amount of carbonic acid gas dissolves in water, and the solubility of the gas in the solvent decreases due to the heat generated in the process of kneading the slurry. Therefore, a neutralization reaction occurs mainly by the contact between the active material (solid phase) and the carbonic acid gas (gas phase). Consequently, usually, it takes 1 hour or longer to finish the neutralization reaction, and the manufacturing lead time can be shortened only to a small extent.

The present inventors have recognized that there is need for providing a slurry manufacturing apparatus, which is for manufacturing a slurry for a positive electrode of a non-aqueous electrolyte secondary battery, and a slurry manufacturing method that make it possible to reliably deaerate surplus carbonic acid gas after an alkali component of a slurry containing an alkali metal complex oxide is neutralized within a short period of time.

The rotation-revolution mixing device may be constituted with a mixing container in which the slurry is mixed and mixing blades which rotate and revolve in the mixing container.

The rotation-revolution mixing device may be constituted with a mixing container in which the slurry is mixed and a rotation-revolution mechanism which causes the mixing container to rotate and revolve.

The rotation-revolution mixing device may have a mixing container in which the slurry is mixed, and the gas injection mechanism may be constituted such that the carbonic acid gas is injected into the mixing container.

The gas injection mechanism may have a sealed container provided in the exterior of the rotation-revolution mixing device, and may be constituted such that the carbonic acid gas is injected into the sealed container.

In this case, a pressure of the carbonic acid gas can be preferably set to be equal to or higher than 0.13 MPa and equal to or lower than 100 MPa, and more preferably set to be equal to or higher than 0.2 MPa and equal to or lower than 10 MPa.

The present invention can be suitably applied in a case where a slurry for a positive electrode of a nonaqueous electrolyte secondary battery containing a lithium complex oxide is prepared.

According to the slurry manufacturing apparatus and the slurry manufacturing method of the present invention, it is possible to reliably deaerate surplus carbonic acid gas after an alkali component in the slurry containing an alkali metal complex oxide is neutralized within a short period of time by using pressurized carbonic acid gas as a neutralizer. Therefore, impurities do not remain in a battery, a nonconductive layer is not formed in the interface between a current collector and an active material layer, conductivity or battery characteristics can be improved, and it is possible to shorten the manufacturing lead time of a positive electrode of a nonaqueous electrolyte secondary battery. Furthermore, because the rotation-revolution mixing device can mix and prepare a slurry by rotational movement and revolving movement, a high-quality slurry can be prepared.

First Embodiment

Hereinafter, a slurry manufacturing apparatus and a slurry manufacturing method according to the present embodiment will be described.

Manufacturing Slurry for Positive Electrode of Nonaqueous Electrolyte Secondary Battery While a hydroxide of an alkali metal contained in an alkali metal complex oxide easily dissolves in water, carbonic acid gas (carbon dioxide) as a neutralizer does not easily dissolve in water under normal pressure.

For example, while lithium hydroxide contained in a lithium complex oxide easily dissolves in water, carbonic acid gas (carbon dioxide) as a neutralizer does not easily dissolve in water under normal pressure.

By the Henry's law, it is known that the amount of carbonic acid gas dissolving in a solvent is proportional to the pressure. That is, in a case where carbonic acid gas is dissolved in a solvent in a pressurized state, the concentration of inorganic carbon (carbon dioxide, carbonic acid, carbonate ions, and bicarbonate ions) in the solvent can be increased.

A reaction rate is heavily dependent on the concentration of a reactant and the environmental temperature. Therefore, the higher the concentration of a reactant and the environmental temperature, the higher the rate of a chemical reaction.

The slurry manufacturing method according to the present embodiment includes a gas injection step of dissolving carbonic acid gas in the slurry prepared by the rotation-revolution mixing step and a deaerating step of deaerating the carbonic acid gas from the slurry having undergone the gas injection step. In the gas injection step, the carbonic acid gas is dissolved in the slurry by injecting the carbonic acid gas under pressure in a sealed state. In a case where the aforementioned steps are adopted, by dissolving the carbonic acid gas in an electrode slurry under a pressure higher than normal pressure, inorganic carbon dissolved in the solvent of the slurry is formed. As a result, an electrode slurry in which an alkali component is neutralized is obtained.

According to the related art, N-methylpyrrolidone (NMP) as an organic solvent used as a solvent of a slurry can also dissolve carbonic acid gas. Therefore, the solvent of the slurry is not particularly limited. However, considering lightening of the environmental load and the solubility of the carbonic acid gas, water is preferable as a solvent.

Incidentally, as methods for dissolving the carbonic acid gas in a liquid, a bubbling method, a carbonate decomposition method, a pressurizing method, and the like are known.

The bubbling method is a method of dissolving carbonic acid gas by causing the carbonic acid gas to flow in a liquid in the form of bubbles. The smaller the volume of the bubbles, the further the carbonic acid gas can be dissolved with higher efficiency. However, in a case where pressure is not applied, the saturated concentration is low, and a neutralization reaction becomes time-consuming.

The carbonate decomposition method is a method of dissolving carbonic acid gas by decomposing a carbonate by using an acid. This method is inappropriate for the present embodiment because an acid needs to be used.

The pressurizing method is a method of dissolving carbonic acid gas in a liquid under pressure.

Among the aforementioned carbonic acid gas dissolving methods, the pressurizing method is used in the present embodiment. In the pressurizing method, according to Henry's law, by increasing the pressure, high-concentration dissolved inorganic carbon can be obtained.

As a neutralizer, carbonic acid gas is used in the form of dissolved inorganic carbon by being dissolved in a solvent. This is not only because the reaction rate is high as described above, but because the pH level does not become lower than 3 even though an excess of neutralizer is added.

As shown in the following reaction formula, through the neutralization reaction caused by dissolving the carbonic acid gas in a solvent, an alkali metal carbonate and an alkali metal hydrogen carbonate are generated as salts. By drying the slurry in which the alkali metal carbonate and the alkali metal hydrogen carbonate are dissolved, it is possible to obtain an electrode coated with the alkali metal carbonate.

First neutralization reaction: 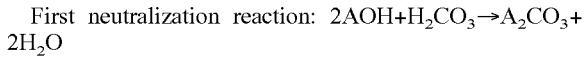 $2AOH+H_2CO_3 \rightarrow A_2CO_3+2H_2O$ Second neutralization reaction: 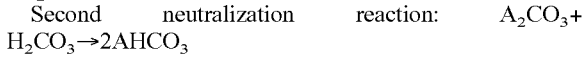 $A_2CO_3+H_2CO_3 \rightarrow 2AHCO_3$ For example, in a case where an alkali metal A is lithium, as shown in the following reaction formula, lithium carbonate and lithium hydrogen carbonate are generated as salts. By drying the slurry in which the lithium carbonate and the lithium hydrogen carbonate are dissolved, it is possible to obtain an electrode coated with the lithium carbonate.

First neutralization reaction: 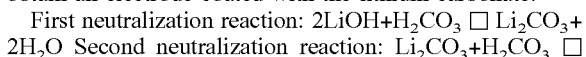 $2LiOH+H_2CO_3 \square Li_2CO_3+2H_2O$ Second neutralization reaction: 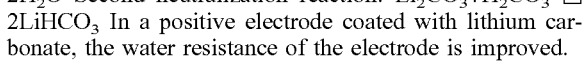 $Li_2CO_3+H_2CO_3 \square 2LiHCO_3$ In a positive electrode coated with lithium carbonate, the water resistance of the electrode is improved.

The electrode manufactured by the slurry manufacturing method of the present embodiment contains a salt (any of lithium carbonate, sodium carbonate, and potassium carbonate) generated by neutralization in the active material layer.

In a case where the electrode does not contain an alkali metal carbonate (any of lithium carbonate, sodium carbonate, and potassium carbonate), the electrolytic solution is decomposed due to overcharging and generates hydrocarbon gas or hydrogen gas that is highly flammable. On the contrary, in the electrode containing an alkali metal carbonate, in a case where the battery is overcharged, carbonic acid gas is generated before the electrolytic solution or the positive electrode is decomposed. Therefore, by increasing the internal pressure of the battery by using the carbonic acid gas, a pressure valve mounted on the battery can be operated. The gas mainly released at this time is carbonic acid gas which is safe.

For performing the neutralization treatment on the slurry, a solvent containing dissolved inorganic carbon may be used as a solvent of the slurry in advance. Alternatively, the neutralization treatment may be performed at the time of mixing the slurry. After the solid contents of the slurry are dispersed and mixed together, the slurry may be neutralized by adding carbonic acid gas to the slurry in a pressurized state.

The amount of the carbonic acid gas used is set such that the pH level of the slurry becomes 4 to 11, preferably becomes 5 to 10, and more preferably becomes 6 to 9 by the addition of the carbonic acid gas.

The higher the pressure of the carbonic acid gas is, the higher the concentration of the obtained dissolved inorganic carbon can be. Therefore, the pressure is not particularly limited as long as it is equal to or higher than normal pressure. However, from the viewpoint of the neutralization reaction rate, the pressure of the carbonic acid gas is equal to or higher than 0.13 MPa, preferably equal to or higher than 0.2 MPa, and even more preferably equal to or higher than 0.3 MPa.

In a case where the pressure is higher than 100 MPa, not only the scale of the manufacturing apparatus, but the amount of the dissolved inorganic carbon remaining in the slurry having undergone the neutralization treatment increases, and hence a deaeration treatment to be performed later becomes difficult. Therefore, the upper limit of the pressure is equal to or lower than 100 MPa, preferably equal to or lower than 50 MPa, and even more preferably equal to or lower than 10 MPa.

Because the dissolved inorganic carbon remains in the slurry having undergone the neutralization treatment, a deaeration treatment is performed.

In a case where the electrode is coated without performing the deaeration treatment, the active material layer foams in a drying step due to the dissolved inorganic carbon, and too many voids are formed. Therefore, coating unevenness or the exfoliation or detachment of the electrode easily occurs.

By performing the deaeration treatment, the dissolved inorganic carbon in the slurry can be separated as carbonic acid gas from the neutralized slurry.

Although membrane deaeration is mainly performed as the deaeration treatment for an electrode slurry of a practical battery, it is difficult to separate the inorganic carbon formed in the slurry by applying pressure.

Therefore, it is preferable to deaerate the inorganic carbon in the slurry as carbonic acid gas by stirring the slurry having undergone the neutralization treatment. Furthermore, in this case, it is preferable that the deaeration is performed under reduced pressure.

The slurry contains an active material and a binder as solid contents. If necessary, a conductive auxiliary agent is added to the slurry.

The active material is not particularly limited as long as it is an alkali metal complex oxide. In a case where the nonaqueous electrolyte secondary battery is a lithium secondary battery, examples of the active material include lithium complex oxides, that is, the materials such as lithium cobaltate ($LiCoO_2$) lithium nickelate ($LiNiO_2$), a ternary material ($LiNi_{0.33}CO_{0.33}Mn_{0.33}O_2$), a nickel-enriched ternary material ($LiNi_{0.5}Co_{0.2}Mn_{0.3}O_2$), lithium nickel-cobalt-aluminate ($LiNi_{0.3}Co_{0.15}Al_{0.05}O_2$), lithium iron phosphate ($LiFePO_4$), lithium manganese-iron-phosphate ($LiFe_{0.5}Mn_{0.5}PO_4$), lithium manganese phosphate ($LiMnPO_4$), lithium cobalt phosphate ($LiCoPO_4$), lithium nickel phosphate ($LiNiPO_4$), lithium vanadium phosphate ($Li_3V_2(PO_4)_3$), lithium iron silicate ($Li_2FeSiO_4$), lithium manganese silicate ($Li_2MnSiO_4$), a lithium-enriched solid solution-based material ($Li_2MnO_3$ $LiNi_{0.33}Mn_{0.33}Co_{0.33}O_2$) spinel-type lithium manganate ($LiMn_2O_4$), spinel-type lithium nickel-manganate ($LiNi_{0.5}Mn_{1.5}O_4$), and lithium nickel-iron-manganate ($LiNi_{0.33}Fe_{0.33}Mn_{0.33}O_2$). One kind of these may be used singly, or two or more kinds of these may be used in combination. The ratio between the elements in the above active materials may be slightly different from the ratio described above. Furthermore, in a case where the nonaqueous electrolyte secondary battery is a sodium secondary battery, the active material may be a sodium complex oxide, that is, lithium as the aforementioned alkali metal element may be substituted with sodium. In a case where the nonaqueous electrolyte secondary battery is a potassium secondary battery, lithium may be substituted with potassium.

Examples of the binder include generally used materials suchaspolyvinylidene fluoride (PVDF), polytetrafluoroethylene (PTFE), polyimide (PI), polyamide, polyamide-imide (PAI), aramid, polyacryl, polyacrylate, an acrylic acid ester, styrene butadiene rubber (SBR), urethane, an ethylene-vinyl acetate copolymer, a styrene-ethylene-butylene-styrene copolymer (SEBS), carboxymethyl cellulose (CMC), cellulose sulfate, methyl cellulose ether, methyl ethyl cellulose ether, ethyl cellulose ether, low-nitrogen hydroxyethyl cellulose dimethyldiallyl ammonium chloride (polyquaternium-4), [2-hydroxy-3-(trimethylammonio)propyl]hydroxyethyl cellulose chloride (polyquaternium-10), [2-hydroxy-3-(lauryldimethylammonio)propyl]hydroxyethyl cellulose chloride (polyquaternium-24), polyvinyl alcohol (PVA), polyvinyl butyral (PVB), ethylene vinyl alcohol, polyethylene (PE), polypropylene (PP), and starch. One kind of these may be used singly or two or more kinds of these may be used in combination.

The conductive auxiliary agent is not particularly limited, and examples thereof include a metal, a carbon material, a conductive polymer, conductive glass, and the like. Among these, a carbon material is preferable, and specific examples thereof include acetylene black (AB), Ketjenblack (KB), vapor-grown carbon fiber (VGCF), carbon nanotubes (CNT), graphite, hard carbon, soft carbon, furnace black, graphene, glassy carbon, carbon nanohorns, and the like. One kind of these may be used singly, or two or more kinds of these may be used in combination.

In the active material layer of the positive electrode, for example, provided that the total amount of the positive electrode active material, the binder, and the conductive material is 100% by mass, the amount of the positive electrode active material is preferably 60% to 99% by mass, the amount of the binder is preferably 0.1% to 25% by mass, and the amount of the conductive material is preferably 0.1% to 10% by mass. The amount of the positive electrode active material is more preferably 80% to 95% by mass, the amount of the binder is more preferably 0.5% to 15% by mass, and the amount of the conductive material is more preferably 0.5% to 5% by mass.

In a case where the active material layer of the positive electrode is composed as above, a sufficient binding force and a conductivity improving effect are obtained.

The neutralizer is not particularly limited as long as it is dissolved inorganic carbon obtained by dissolving carbonic acid gas in the solvent of the slurry. That is, the dissolved inorganic carbon may be generated using a gas such as air containing carbonic acid gas or the carbonic acid gas generated from a solid including dry ice. In order to efficiently obtain the dissolved inorganic carbon at a relatively low pressure, it is preferable to use a high-concentration carbonic acid gas.

By using the slurry for a positive electrode of a nonaqueous electrolyte secondary battery that is obtained as described above, a positive electrode of a nonaqueous electrolyte secondary battery, specifically, a positive electrode of a nonaqueous electrolyte secondary battery coated with an alkali metal carbonate can be manufactured. By using the positive electrode, a nonaqueous electrolyte secondary battery can be manufactured. Furthermore, the nonaqueous electrolyte secondary battery can be suitably used in electronic devices.

Slurry Manufacturing Apparatus

The manufacturing of the slurry for a positive electrode of a nonaqueous electrolyte secondary battery described above can be suitably performed using the slurry manufacturing apparatus of the present embodiment. A slurry manufacturing apparatus 1 shown in FIG. 1 is constituted with a rotation-revolution mixing device 10 and a gas injection mechanism 20 built in the rotation-revolution mixing device 10.

The rotation-revolution mixing device 10 is a device which mixes and prepares a slurry by rotational movement and revolving movement, and is constituted with a mixing container 11, two mixing blades 12 and 13, a driving mechanism 14, and a moving mechanism 15. The mixing container 11 is a cylindrical open-top container. The mixing blades 12 and 13 are plate-like members each having an opening portion. By being driven by the driving mechanism 14, the mixing blades 12 and 13 rotate and revolve in the mixing container 11.

Figure 2:
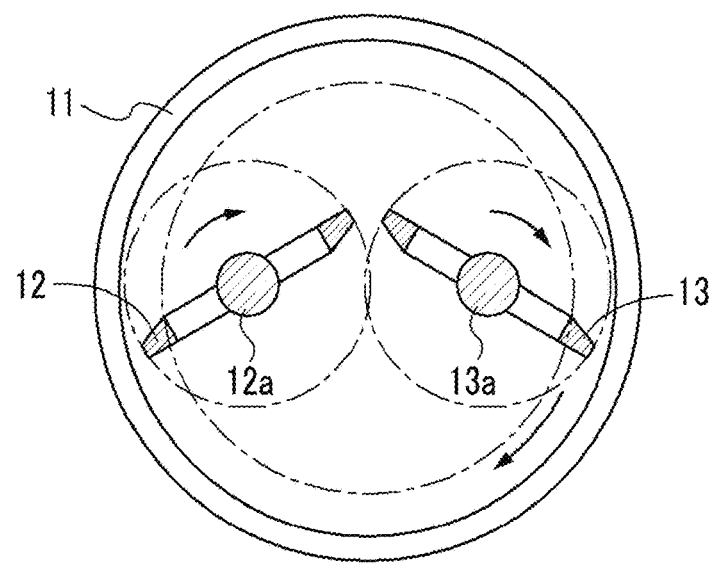
FIG. 2 is a view showing rotational motion and revolving motion of mixing blades.

The driving mechanism 14 is a mechanism that rotates and drives the mixing blades 12 and 13. Specifically, as shown in FIG. 2, the driving mechanism 14 causes a central shaft 12a of the mixing blade 12 and a central shaft 13a of the mixing blade 13 to rotate while revolving around the center of the mixing container 11. As a result, the mixing blades 12 and 13 rotate and revolve in the mixing container 11. By the movement of the mixing blades 12 and 13, the slurry material in the mixing container 11 is mixed, and hence a slurry is prepared.

The moving mechanism 15 is a mechanism which moves the mixing container 11 up and down. In a case where the moving mechanism 15 moves the mixing container 11 up, and the mixing container 11 comes into contact with the driving mechanism 14, the opening on top of the mixing container 11 is blocked by the lower surface of the driving mechanism 14, and the materials of the slurry are sealed in the mixing container 11.

The gas injection mechanism 20 is a mechanism dissolving carbonic acid gas in the slurry prepared by the rotation-revolution mixing device 10. In the present embodiment, the gas injection mechanism 20 is built in the rotation-revolution mixing device 10, and carbonic acid gas from a carbonic acid gas supply source not shown in the drawing is injected into the sealed mixing container 11. That is, the gas injection mechanism 20 dissolves the carbonic acid gas in the slurry by injecting the carbonic acid gas under pressure in a sealed state. By injecting pressurized carbonic acid gas into a gas-phase portion above the slurry in the sealed mixing container 11, the gas injection mechanism 20 injects the carbonic acid gas under pressure. The carbonic acid gas may be injected by inserting the tip of a carbonic acid gas supply pipe into the slurry and ejecting the carbonic acid gas from the pipe in the liquid phase of the slurry.

The gas injection mechanism 20 dissolves the carbonic acid gas in the slurry by injecting the carbonic acid gas under pressure into the mixing container 11 at a pressure of the carbonic acid gas of equal to or higher than 0.13 MPa and equal to or lower than 100 MPa. More suitably, the gas injection mechanism 20 dissolves the carbonic acid gas in the slurry at a pressure of the carbonic acid gas of equal to or higher than 0.2 MPa and equal to or lower than 10 MPa.

As described above, the slurry manufacturing apparatus 1 according to the present embodiment is a slurry manufacturing apparatus for manufacturing a slurry for a positive electrode of a nonaqueous electrolyte secondary battery containing an alkali metal complex oxide, and includes the rotation-revolution mixing device 10 which mixes and prepares a slurry by rotational movement and revolving movement, and the gas injection mechanism 20 which dissolves carbonic acid gas in the slurry prepared by the rotation-revolution mixing device 10. The gas injection mechanism 20 dissolves the carbonic acid gas in the slurry by injecting the carbonic acid gas under pressure in a sealed state. The rotation-revolution mixing device 10 includes the mixing container 11 in which the slurry is mixed, and the mixing blades 12 and 13 that rotate and revolve in the mixing container 11. The gas injection mechanism 20 injects the carbonic acid gas into the mixing container 11.

Slurry Manufacturing Method

Next, a slurry manufacturing method performed by the slurry manufacturing apparatus 1 shown in FIG. 1 will be described. The slurry manufacturing method according to the present embodiment is a slurry manufacturing method for manufacturing a slurry for a positive electrode of a nonaqueous electrolyte secondary battery containing an alkali metal complex oxide, and includes a rotation-revolution mixing step, a gas injection step, and a deaerating step.

In the rotation-revolution mixing step, by using the aforementioned rotation-revolution mixing device 10, a slurry is mixed and prepared by rotational movement and revolving movement. Specifically, first, materials of a slurry are put into the mixing container 11 of the rotation-revolution mixing device 10. Then, the moving mechanism 15 moves the mixing container 11 up, such that the mixing container 11 comes into contact with the driving mechanism 14 and is sealed. Thereafter, the driving mechanism 14 operates such that the mixing blades 12 and 13 rotate and revolve in the mixing container 11, and hence a slurry is mixed.

In the gas injection step, carbonic acid gas is dissolved in the slurry prepared by the rotation-revolution mixing step. Specifically, the gas injection mechanism 20 operates, and hence carbonic acid gas is injected under pressure into the sealed mixing container 11. The injected carbonic acid gas is dissolved in the slurry and becomes inorganic carbon, and the alkali component in the slurry is neutralized.

In the deaerating step, the carbonic acid gas is deaerated from the slurry having undergone the gas injection step. Specifically, the mixing container 11 becomes unsealed, and the driving mechanism 14 causes the mixing blades 12 and 13 to rotate and revolve such that the slurry in the mixing container 11 is stirred. In this way, the inorganic carbon in the slurry is deaerated as carbonic acid gas.

Second Embodiment

Figure 3:
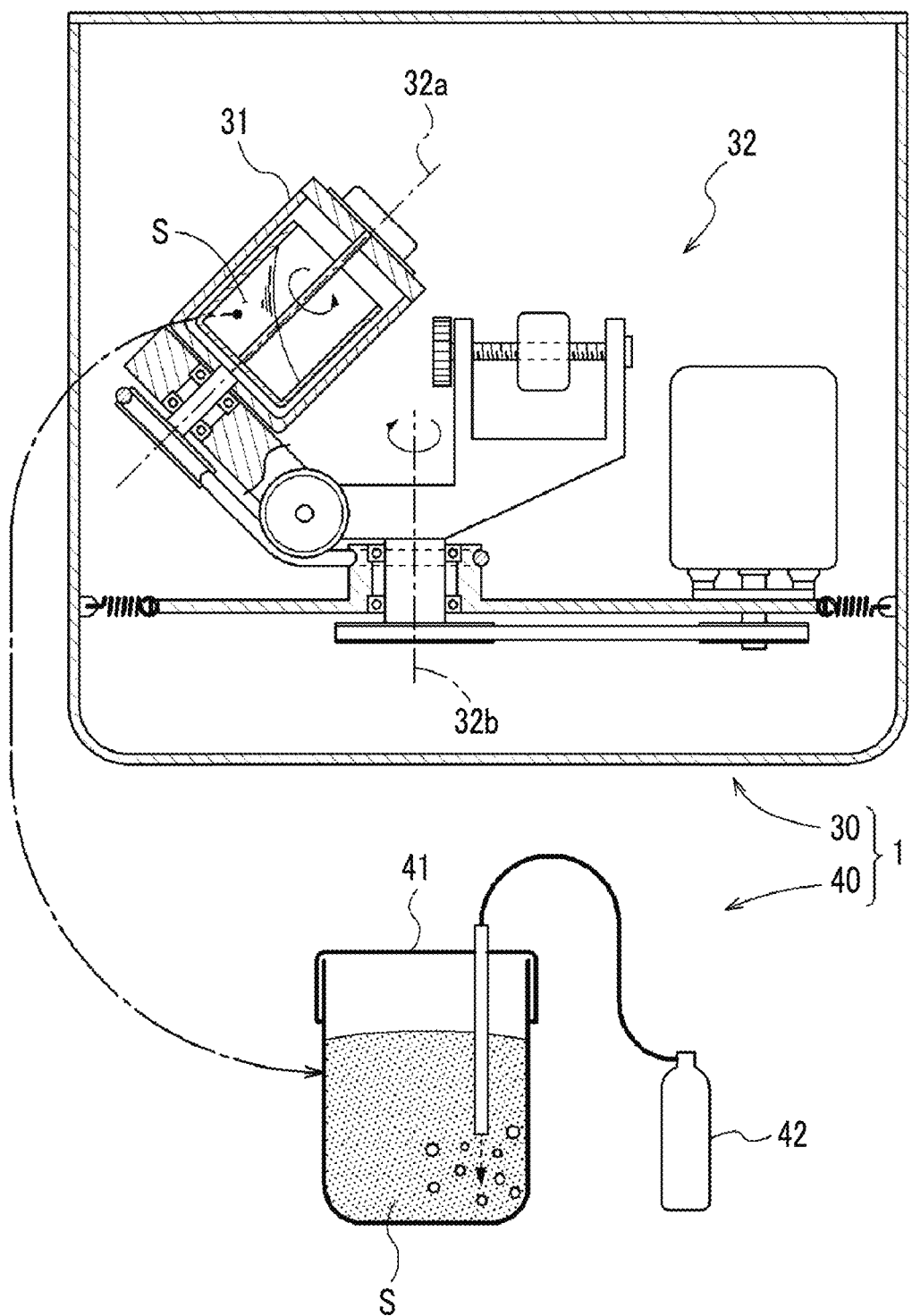
FIG. 3 is a view showing another example of the slurry manufacturing apparatus.

As shown in FIG. 3, the slurry manufacturing apparatus 1 of the present embodiment is constituted with a rotation-revolution mixing device 30 and a gas injection mechanism 40. Hereinafter, in the description of a second embodiment, the same constitution as that of the first embodiment will be marked with the same reference sign and will not be described in some cases.

The rotation-revolution mixing device 30 is constituted with a mixing container 31 in which a slurry S is mixed, and a rotation-revolution mechanism 32 which causes the mixing container 31 to rotate and revolve. The gas injection mechanism 40 includes a sealed container 41 provided in the exterior of the rotation-revolution mixing device 30, and injects carbonic acid gas into the sealed container 41.

The mixing container 31 is a cylindrical container and held in the rotation-revolution mechanism 32 in a state where the central axis of the cylinder inclines with respect to the vertical direction.

As shown in FIG. 3, the rotation-revolution mechanism 32 holds the inclined mixing container 31. By using a motor as a driving source, the rotation-revolution mechanism 32 causes the mixing container 31 to revolve around a revolution axis 32b while rotating around a rotation axis 32a. The rotation axis 32a coincides with the central axis of the mixing container 31 and inclines with respect to the vertical direction. The revolution axis 32b coincides with the vertical direction.

The gas injection mechanism 40 is constituted with the sealed container 41 and a gas supply portion 42. The sealed container 41 is a container provided in the exterior of the rotation-revolution mixing device 30, and accommodates the slurry S prepared by the rotation-revolution mixing device 30 in the interior thereof. The gas supply portion 42 injects pressurized carbonic acid gas under pressure into the sealed container 41.

As described above, the slurry manufacturing apparatus 1 according to the present embodiment is a slurry manufacturing apparatus for manufacturing a slurry for a positive electrode of a nonaqueous electrolyte secondary battery containing an alkali metal complex oxide, and includes the rotation-revolution mixing device 30 which mixes and prepares a slurry by rotational movement and revolving movement and the gas injection mechanism 40 which dissolves carbonic acid gas in the slurry prepared by the rotation-revolution mixing device 30. The gas injection mechanism 40 dissolves the carbonic acid gas in the slurry by injecting the carbonic acid gas under pressure in a sealed state. The rotation-revolution mixing device 30 includes the mixing container 31 in which the slurry is mixed, and the rotation-revolution mechanism 32 which causes the mixing container 31 to rotate and revolve. The gas injection mechanism 40 has the sealed container 41 provided in the exterior of the rotation-revolution mixing device 30, and injects the carbonic acid gas into the sealed container 41.

Slurry Manufacturing Method

Next, the slurry manufacturing method performed by the slurry manufacturing apparatus 1 shown in FIG. 3 will be described. The slurry manufacturing method according to the present embodiment is a slurry manufacturing method for manufacturing a slurry for a positive electrode of a nonaqueous electrolyte secondary battery containing an alkali metal complex oxide, and includes a rotation-revolution mixing step, a gas injection step, and a deaerating step.

In the rotation-revolution mixing step, by using the aforementioned rotation-revolution mixing device 30, a slurry is mixed and prepared by rotational movement and revolving movement. Specifically, first, materials of a slurry are put into the mixing container 31 of the rotation-revolution mixing device 30. Then, the rotation-revolution mechanism 32 operates such that the mixing container 31 rotates and revolves, and hence the slurry S is mixed. The prepared slurry S is moved to the sealed container 41 of the gas injection mechanism 40.

In the gas injection step, carbonic acid gas is dissolved in the slurry S prepared by the rotation-revolution mixing step. Specifically, the gas supply portion 42 of the gas injection mechanism 40 operates, and hence carbonic acid gas is injected under pressure into the sealed container 41. The injected carbonic acid gas is dissolved in the slurry S and becomes inorganic carbon, and the alkali component in the slurry S is neutralized. The slurry S having undergone the gas injection step is moved again to the mixing container 31 of the rotation-revolution mixing device 30.

In the deaerating step, the carbonic acid gas is deaerated from the slurry S having undergone the gas injection step. Specifically, the rotation-revolution mechanism 32 operates such that the mixing container 31 rotates and revolves, and hence the slurry S is stirred. As a result, the inorganic carbon in the slurry S is deaerated as carbonic acid gas.

Other Embodiments (1) In the first embodiment (mixing performed using rotary blades that rotate and revolve) described above, the gas injection mechanism 20 is built in the rotation-revolution mixing device 10, and carbonic acid gas is injected under pressure into the slurry by using the mixing container 11 of the rotation-revolution mixing device 10. As in the second embodiment which is a modified embodiment of the first embodiment, carbonic acid gas may be injected under pressure into the slurry in the exterior of the rotation-revolution mixing device 10.

(2) In the second embodiment (mixing performed using a container that rotates and revolves) described above, the gas injection mechanism 40 is provided in the exterior of the rotation-revolution mixing device 30, and carbonic acid gas is injected under pressure into the slurry by using the sealed container 41 in the exterior of the rotation-revolution mixing device 30. In an embodiment which is a modified embodiment of the second embodiment, the gas injection mechanism 40 may be built in the rotation-revolution mixing device 30, and the gas injection mechanism 40 may be constituted such that the carbonic acid gas is injected under pressure into the mixing container 31 of the rotation-revolution mixing device 30.

(3) In the first and second embodiments described above, carbonic acid gas is injected under pressure into the slurry prepared by the rotation-revolution mixing device 10 or the rotation-revolution mixing device 30. The carbonic acid gas may be injected under pressure by a step performed before the slurry is prepared. For example, carbonated water may be generated by injecting carbonic acid gas under pressure into water and mixed with a slurry material. After the slurry material is mixed with water and carbonic acid gas is injected under pressure into the mixture, the rotation-revolution mixing step may be performed using the rotation-revolution mixing device 10 (or the rotation-revolution mixing device 30). That is, the gas injection mechanism 20 (40) dissolves the carbonic acid gas in the slurry material by injecting the carbonic acid gas under pressure in a sealed state.

In the second embodiment, in a case where carbonic acid gas is injected under pressure by a step performed before a slurry is prepared, a plurality of mixing containers 31 are prepared in advance, a slurry material is put into the containers, and carbonic acid gas is injected under pressure into the slurry material. The plurality of mixing containers 31 are sequentially set in the rotation-revolution mixing device 30, and then a mixing treatment is performed. According to this aspect, a slurry can be efficiently prepared.

(4) Carbonic acid gas may be injected under pressure while the slurry is being mixed using the rotation-revolution mixing device 10 or the rotation-revolution mixing device 30. In this case, it can be said that the gas injection mechanism 20 (40) injects the carbonic acid gas under pressure into the slurry prepared using the rotation-revolution mixing device 10 (30) or injects the carbonic acid gas under pressure into the slurry material. Furthermore, it can be said that the slurry manufacturing apparatus 1 injects the carbonic acid gas under pressure into the slurry by using the gas injection mechanism 20 (40) while mixing and preparing the slurry by using the rotation-revolution mixing device 10 (30).

Figure 4:
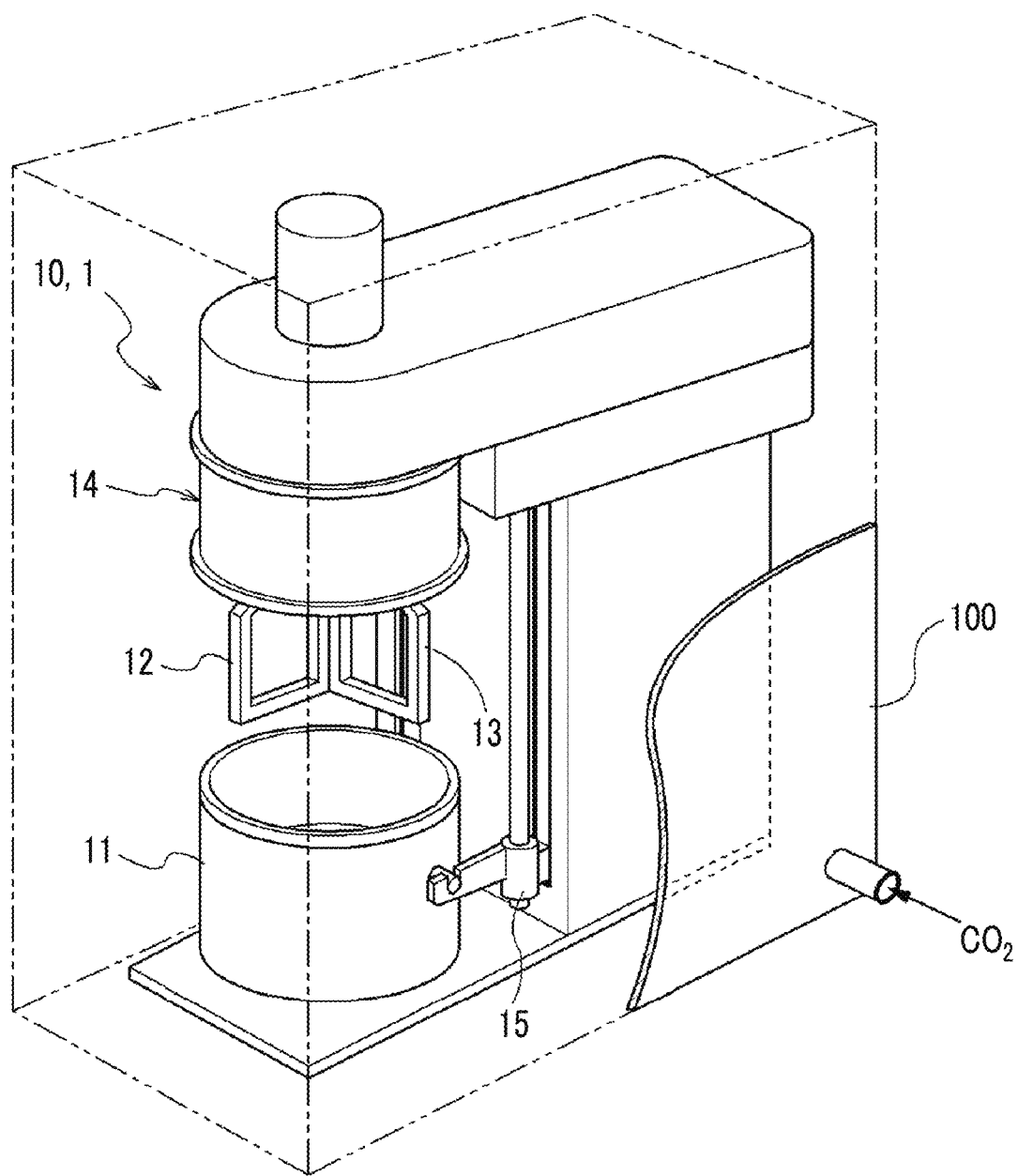
FIG. 4 is a view showing another example of the slurry manufacturing apparatus.

(5) As shown in FIG. 4, carbonic acid gas may be injected under pressure into the slurry by sealing the entirety of the rotation-revolution mixing device 10 of the first embodiment by means of covering the rotation-revolution mixing device 10 with a case 100 and applying pressure thereto by means of introducing carbonic acid gas into the case 100. In this case, the mixing container 11 does not have a sealed structure, and the carbonic acid gas in the case 100 comes into contact with the slurry in the mixing container 11.

Figure 5:
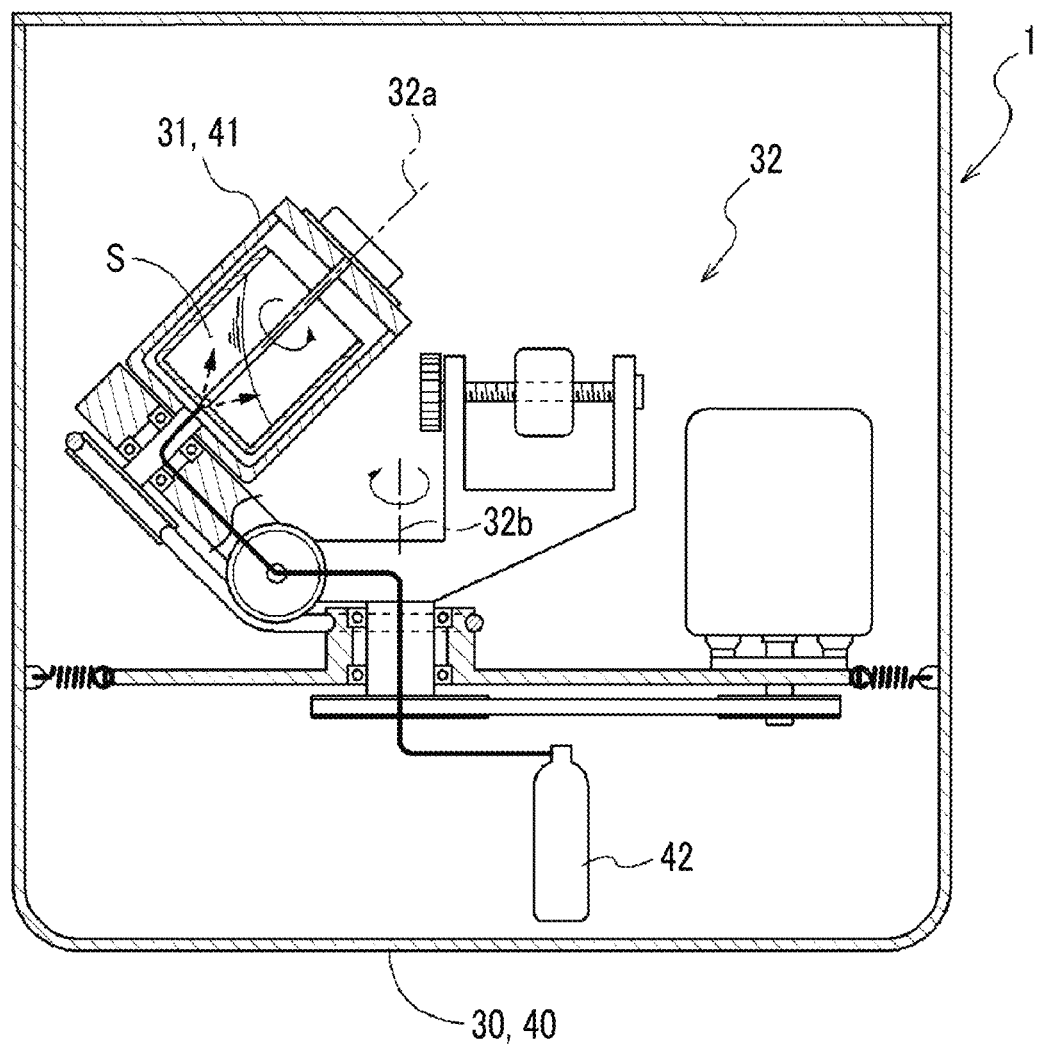
FIG. 5 is a view showing another example of the slurry manufacturing apparatus.

As shown in FIG. 5, a sealed structure may be established in the mixing container 31 of the slurry manufacturing apparatus 1 according to the second embodiment, and carbonic acid gas may be supplied into the mixing container 31 from the gas supply portion 42. That is, the mixing container 31 may also function as the sealed container 41 of the gas injection mechanism 40.

Figure 6:
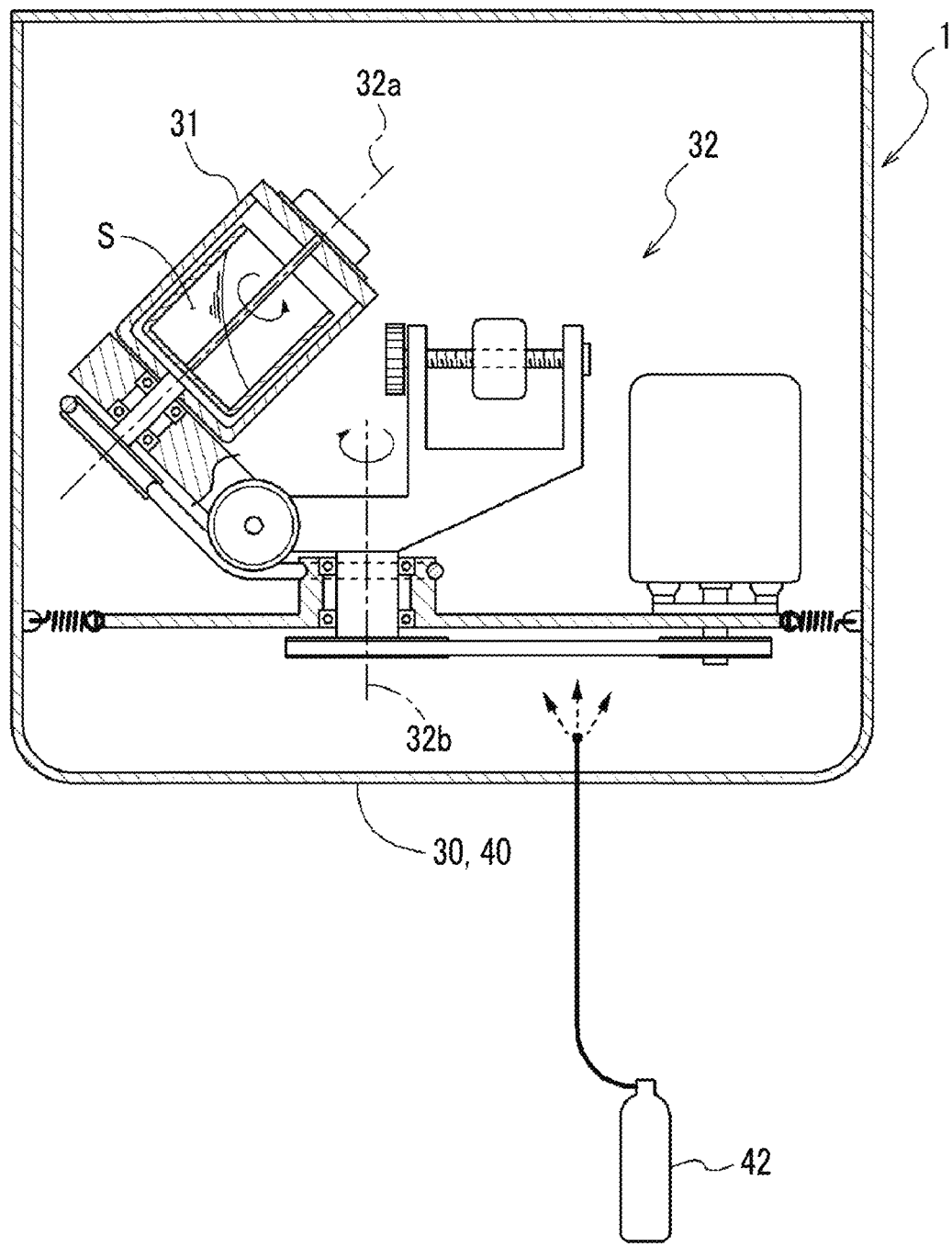
FIG. 6 is a view showing another example of the slurry manufacturing apparatus.

(7) As shown in FIG. 6, a sealed structure may be established in a housing of the rotation-revolution mixing device 30 according to the second embodiment, and carbonic acid gas may be supplied into the rotation-revolution mixing device 30 from the gas supply portion 42. In this case, a sealed structure is not established in the mixing container 31, and the carbonic acid gas in the rotation-revolution mixing device 30 comes into contact with the slurry in the mixing container 31.

Figure 7:
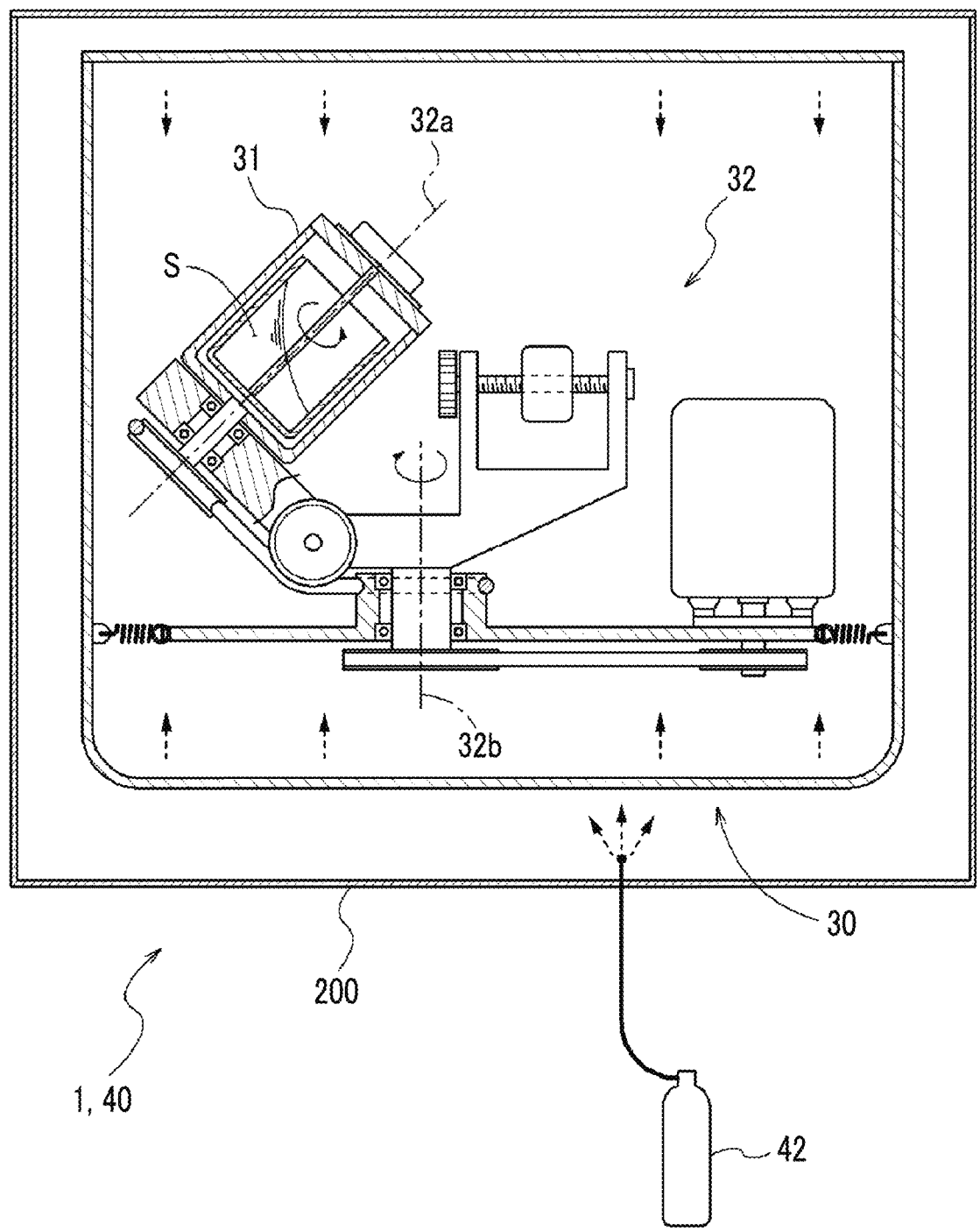
FIG. 7 is a view showing another example of the slurry manufacturing apparatus.

(8) As shown in FIG. 7, carbonic acid gas may be injected under pressure into the slurry by sealing the entirety of the rotation-revolution mixing device 30 according to the second embodiment by means of covering the rotation-revolution mixing device 30 with a case 200 and applying pressure thereto by introducing carbonic acid gas into the case 200 from the gas supply portion 42. In this case, a sealed structure is not established in the mixing container 31, and the carbonic acid gas in the case 200 comes into contact with the slurry in the mixing container 31.

Unless a contradiction is present, the constitutions disclosed in the aforementioned embodiments (including other embodiments, the same shall be applied in the following description) can be applied in combination with constitutions disclosed in other embodiments. Furthermore, the embodiments disclosed in the present specification are merely examples, and embodiments of the present invention are not limited thereto and can be appropriately modified within a range that does not depart from the desirable aspect of the present invention.

It should be understood that the invention is not limited to the above-described embodiment, but may be modified into various forms on the basis of the spirit of the invention. Additionally, the modifications are included in the scope of the invention.

What is claimed is:

1. A slurry manufacturing apparatus comprising:
a gas injection mechanism connected to a mixing container in a manner that permits the gas injection mechanism to inject a gas into the mixing container; and
a mixing device configured to:
seal, before the gas injection mechanism injects the gas into the mixing container, the mixing container in a manner that causes the mixing container to become a sealed container,
mix, in the sealed container while the gas injection mechanism injects the gas into the sealed container, slurry materials in a manner that produces a slurry, and
unseal, after the gas injection mechanism injects the gas into the sealed container, the sealed container while the mixing device stirs the slurry.

2. The slurry manufacturing apparatus according to claim 1, wherein the mixing device is configured to rotate and revolve to stir the slurry.

3. The slurry manufacturing apparatus according to claim 1, wherein the mixing device is configured to mix the slurry materials by rotational and revolving movement of the mixing device.

4. The slurry manufacturing apparatus according to claim 1, wherein the gas is a carbonic acid gas.

5. The slurry manufacturing apparatus according to claim 1, wherein the gas injection mechanism is configured to inject the gas into the mixing container before the mixing device mixes the slurry materials.

6. The slurry manufacturing apparatus according to claim 1, wherein the gas injection mechanism configured to inject, under a pressure higher than normal pressure, the gas into the sealed container.

7. The slurry manufacturing apparatus according to claim 6, wherein the pressure is equal to or higher than 0.13 MPa and equal to or lower than 100 MPa.

8. The slurry manufacturing apparatus according to claim 6, wherein the pressure is equal to or higher than 0.2 MPa and equal to or lower than 10 MPa.

9. The slurry manufacturing apparatus according to claim 1, wherein the gas injection mechanism is configured to inject the gas into the slurry.

10. The slurry manufacturing apparatus according to claim 1, wherein the gas injection mechanism is configured to dissolve, by injecting the gas into the mixing container, the gas in the slurry.

11. The slurry manufacturing apparatus according to claim 1, wherein the slurry is configured to coat a positive electrode of a nonaqueous electrolyte secondary battery.

12. The slurry manufacturing apparatus according to claim 1, wherein the slurry contains a lithium complex oxide.

13. The slurry manufacturing apparatus according to claim 1, wherein the slurry materials comprise an alkali metal complex oxide.

14. The slurry manufacturing apparatus according to claim 13, wherein the slurry materials comprise a binder.

15. The slurry manufacturing apparatus according to claim 13, wherein the slurry materials comprise a conductive auxiliary agent.

16. The slurry manufacturing apparatus according to claim 1, wherein the mixing device is configured to unseal the sealed container after the gas injection mechanism ceases injecting the gas into the sealed container.

* * * * *